(12) United States Patent
Nakatsuka (10) Patent No.: US 6,429,719 B1
(45) Date of Patent: Aug. 6, 2002

(54) SIGNAL PROCESSING CIRCUIT FOR CHARGE GENERATION TYPE DETECTION DEVICE

(75) Inventor: Junji Nakatsuka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/450,070

(22) Filed: Nov. 29, 1999

(30) Foreign Application Priority Data

Nov. 27, 1998 (JP) .......................................... 10-337185

(51) Int. Cl.$^7$ ................................................. G06G 7/19
(52) U.S. Cl. ...................................... 327/344; 327/345
(58) Field of Search ................................. 327/334, 336, 327/337, 344, 345

(56) References Cited

U.S. PATENT DOCUMENTS

| | | | |
|---|---|---|---|
| 5,363,055 A | * 11/1994 | Ribner | ........................... 330/9 |
| 5,495,199 A | * 2/1996 | Hirano | ........................ 327/337 |
| 5,608,345 A | * 3/1997 | Macbeth et al. | ............. 327/337 |
| 5,973,536 A | * 10/1999 | Maejima | ...................... 327/337 |
| 4,893,088 A | * 2/2000 | Myers et al. | ................ 327/337 |
| 6,031,415 A | * 2/2000 | Shou et al. | .................. 327/337 |

FOREIGN PATENT DOCUMENTS

| | | |
|---|---|---|
| JP | 01-212111 | 8/1989 |
| JP | 6-56743 | 8/1994 |
| JP | 08-162961 | 6/1996 |
| JP | 09-027731 | 1/1997 |
| JP | 09053985 | 2/1997 |

* cited by examiner

Primary Examiner—Kenneth B. Wells
(74) Attorney, Agent, or Firm—Snell & Wilmer; Michael K. Kelly (57) ABSTRACT

A signal processing circuit for a charge generation type detection device of the present invention includes a charge-voltage conversion circuit for converting a charge generated in the charge generation type detection device to a voltage. The charge-voltage conversion circuit includes: a first capacitor for storing the charge generated in the charge generation type detection device; an operational amplifier connected to the first capacitor to form a feed-back loop; and a first switch connected in parallel with the first capacitor for discharging the charge stored in the first capacitor. The first switch includes a first transistor for generating a first clock feed-through and a second transistor for generating a second clock feed-through, the first switch being configured so that at least a portion of the first clock feed-through is canceled by the second clock feed-through.

2 Claims, 8 Drawing Sheets

SIGNAL PROCESSING CIRCUIT FOR CHARGE GENERATION TYPE DETECTION DEVICE

BACKGROUND OF THE INVENTION

1. Field of the Invention

The present invention relates to a signal processing circuit for use in a charge generation type detection device, such as a pyroelectric sensor, an infrared sensor, and a pressure sensor, including a charge-voltage conversion circuit for converting a charge generated in the charge generation type detection device to a voltage.

2. Description of the Related Art

In recent years, in the field of surveillance camera apparatuses, object sorting apparatuses, and the like, there has been a demand for a system capable of performing a high-level information processing operation by obtaining information such as the position, the size, and the traveling speed of an object, as well as the number of objects and whether the object is in contact with another object. For example, in order to realize high level security, a surveillance camera apparatus is required to detect infrared radiation from a human to produce such information.

Figure 8:
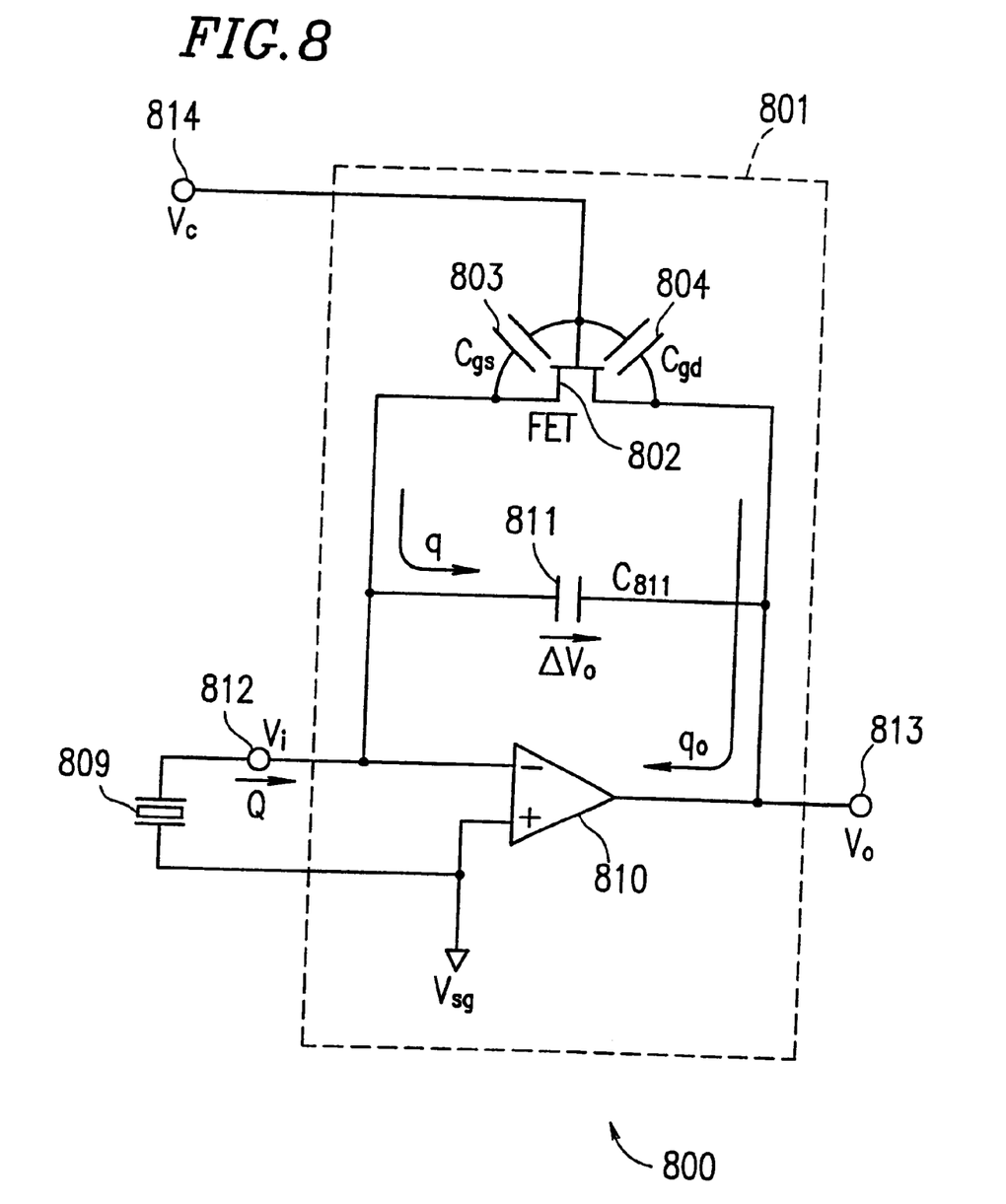
FIG. 8 illustrates a configuration of a conventional infrared radiation detection circuit.

FIG. 8 illustrates a configuration of a conventional infrared radiation detection circuit 800 as an exemplary signal processing circuit of a charge generation type detection device.

The infrared radiation detection circuit 800 includes a charge-voltage conversion circuit 801 for converting a charge-generated in an infrared sensor 809 to a voltage. The charge-voltage conversion circuit 801 includes an input terminal 812, an output terminal 813 and a control terminal 814.

One terminal of the infrared sensor 809 is connected to a signal ground potential $V_{sg}$, and the other terminal thereof is connected to an input terminal 812 of the charge-voltage conversion circuit 801, The charge-voltage conversion circuit 801 includes a capacitor 811 for storing a charge generated in the infrared sensor 809, an operational amplifier 810 which is connected to the capacitor 811 to form a feed-back loop, and a field effect transistor (hereinafter, referred to simply as "FET") 802 as a reset switch which is connected in parallel with the capacitor 811.

The FET 802 is controlled according to a control voltage $V_c$ applied to the control terminal 814. When $V_c = V_{DD}$, the FET 802 is turned ON. Herein, $V_{DD}$ denotes a power supply voltage and $V_{SS}$ denotes a ground voltage. In this way, the FET 802 is repeatedly turned ON/OFF according to the control voltage $V_c$.

Thus, the charge-voltage conversion circuit 801 functions as a switched capacitor integration circuit ("SC integration circuit").

An operation of the charge-voltage conversion circuit 801 will now be described.

When $V_c = V_{DD}$, the FET 802 is turned ON, thereby initializing the charge-voltage conversion circuit 801 with the amount of charge in the capacitor 811 being reset to zero. In this case, an output voltage $V_o$ at the output terminal 813 ss expressed by Expression (1) below.

$$V_o = V_{sg} \quad (1)$$

Then, when $V_o = V_{SS}$, the FET 802 is turned OFF, thereby starting an operation of integrating the amount of charge being input from the infrared sensor 809 to the charge-voltage conversion circuit 801. When an amount of charge Q flows from the infrared sensor 809 into the charge-voltage conversion circuit 801 during a period in which the FET 802 is OFF, the output voltage $V_o$ at the output terminal 813 is expressed by Expression (2) below.

$$V_o = V_{sg} - Q/C_{811} \quad (2)$$

Herein, $C_{811}$ denotes the capacitance value of the capacitor 811.

Thus, the amount of voltage change $\Delta V_o$ at the output terminal 813, which corresponds to the amount of charge Q generated in the infrared sensor 809 during d period in which the FET 802 is turned OFF, is expressed by Expression (3) below, based on Expressions (1) and (2).

$$\Delta V_o = -Q/C_{811} \quad (3)$$

Thus, the charge-voltage conversion circuit 801 can generate a voltage according to the amount of charge Q generated in the infrared sensor 809.

A parasitic capacitance exists in the FET 802 of the charge-voltage conversion circuit 801. As illustrated in FIG. 8, the parasitic capacitance of the FET 802 includes a parasitic capacitance 803 between the gate and the source of the FET 802 and a parasitic capacitance 804 between the gate and the drain of the FET 802. Herein, $C_{gs}$ denotes the capacitance value of the parasitic capacitance 803 and $C_{gd}$ denotes the capacitance value of the parasitic capacitance 804.

Transition of the FET 802 from ON to OFF (i.e., transition of the control voltage $V_c$ applied to the control terminal 814) generates a clock feed-through in the FET 802. Due to the clock feed-through, a charge q is provided to one end of the capacitor 811 and another charge $q_o$ is provided to the output of the operational amplifier 810.

The charge q is expressed by Expression (4) below, and the charge $q_o$ is expressed by Expression (5) below.

$$q = -C_{gs} \cdot (V_{DD} - V_{SS}) \quad (4)$$

$$q_o = -C_{gd} \cdot (V_{DD} - V_{SS}) \quad (5)$$

Due to the charge q, an offset voltage $\Delta V_{offset}$ occurs at the output terminal 813. The offset voltage $\Delta V_{offset}$ is expressed by Expression (6) below.

$$\Delta V_{offset} = C_{gs}/C_{811} \cdot (V_{DD} - V_{SS}) \quad (6)$$

As can be seen from Expression (6), the offset voltage $\Delta V_{offset}$ is a constant voltage. Since the offset voltage $\Delta V_{offset}$ is added to the output voltage $V_o$ the offset voltage $\Delta V_{offset}$ becomes a DC offset voltage error in the output voltage $V_o$. The error has been A significant drawback to realization of high-sensitivity infrared radiation detection.

Moreover, the output of the operational amplifier 810 is designed to have the lowest impedance $Z_o$ among other devices connected to the output terminal 813. Therefore, all of the charge $q_o$ as shown in Expression (5) flows into the output of the operational amplifier 810. As a result, an offset voltage $\Delta V_{offset}(t)$ occurs at the output terminal 813 due to the charge $q_o$. The offset voltage $\Delta V_{offset}(t)$ is expressed by Expression (7) below.

$$\Delta V_{offset}(t) = Z_o \cdot \{\partial(q_o)/\partial t\} \quad (7)$$

As can be seen from Expression (7), the offset voltage $\Delta V_{offset}(t)$ Ls a transitional voltage which varies over time. The offset voltage $\Delta V_{offset}(t)$ is high-frequency noise to the output voltage $V_o$. The high-frequency noise has been a significant drawback to realization of high-sensitivity infrared radiation detection.

Moreover, as the intensity of the infrared radiation increases, the amount of charge Q generated in the infrared sensor 809 also increases. In a region where the amount of charge Q is large, the output voltage $V_o$ does not change according to Expression (2), resulting in a situation where the output voltage $V_o$ is saturated to the level of the power supply voltage $V_{DD}$ or the ground voltage $V_{SS}$. This has been a drawback to realization of an infrared radiation detection circuit having a wide dynamic range.

Furthermore, in order to realize an infrared radiation detection apparatus including a plurality of infrared sensors arranged in a one-dimensional or two-dimensional arrangement, the infrared radiation detection apparatus needs to include a plurality of charge-voltage conversion circuits. This increases the circuit scale of the infrared radiation detection apparatus, thereby making the apparatus high in cost and large in size.

In addition, external noise, particularly a 50 Hz or 60 Hz commercial frequency, may further be superimposed on the output voltage $V_o$, thereby reducing the infrared radiation detection capability. In order to reduce such noise, a filter circuit is used. However, it was not possible in the prior art to have such a filter circuit built in the charge-voltage conversion circuit. Therefore, the filter circuit had to be provided in a stage subsequent to the charge-voltage conversion circuit as a separate circuit from the charge-voltage conversion circuit. This has increased the circuit scale of the infrared radiation detection apparatus, thereby making the apparatus high in cost and large in size. The filter circuit could not be built in the charge-voltage conversion circuit because the capacitance value $C_{811}$ of the capacitor 811 is small, whereby a resistor having a large enough resistance value to set the cut-off frequency of the filter circuit to a desired value could not be provided in the charge-voltage conversion.

The infrared radiation detection apparatus performs a chopping operation by alternately accepting and blocking the incoming infrared radiation at a low frequency of about 30 Hz. Thus, the infrared radiation detection signal will have the same frequency as the chopping frequency. When the operational amplifier of the charge-voltage conversion circuit employs a semiconductor circuit in which a switch, or the like, is provided by using a CMOS type transistor, the influence of flicker noise, i.e., 1/f noise, increases. When a switched capacitor circuit is employed, the influence of quantization noise increases. Thus, the signal-to-noise ratio is deteriorated, thereby lowering the detection capability.

SUMMARY OF THE INVENTION

According to one aspect of this invention, a signal processing circuit for a charge generation type detection device includes a charge-voltage conversion circuit for converting a charge generated in the charge generation type detection device to a voltage. The charge-voltage conversion circuit includes a first capacitor for storing the charge generated in the charge generation type detection device: an operational amplifier connected to the first capacitor to form a feed-back loop; and a first switch connected in parallel with the first capacitor for discharging the charge stored in the first capacitor. The first switch includes a first transistor for generating a first clock feed-through and a second transistor for generating a second clock feed-through, the first switch being configured so that at least a portion of the first clock feed-through is canceled by the second clock feed-through.

In one embodiment of the invention, the first switch is a CMOS type switch including a P-channel type transistor as the first transistor and an N-channel type transistor as the second transistor. The CMOS type switch is configured so as to satisfy $C_{pgs}=C_{ngs}$ and $C_{pgd}=C_{ngd}$, where $C_{pgs}$ denotes a gate-source capacitance of the P-channel type transistor, $C_{ngs}$ denotes a gate-source capacitance of the N-channel type transistor, $C_{pgd}$ denotes a gate-drain capacitance of the P-channel type transistor, and $C_{ngd}$ denotes a gate-drain capacitance of the N-channel type transistor.

In one embodiment of the invention, the signal processing circuit further includes a circuit including a second capacitor and a second switch controlled according to a gain control voltage. The circuit is connected in parallel with the first capacitor.

In one embodiment of the invention, the signal processing circuit further includes a switched capacitor circuit connected in parallel with the first capacitor, the switched capacitor circuit functioning as a resister.

In one embodiment of the invention, the signal processing circuit further includes a feed-back circuit for feeding an output of the charge-voltage conversion circuit back to an input of the charge-voltage conversion circuit. The charge-voltage conversion circuit and the feed-back circuit are configured to have a delta/sigma modulation function.

In one embodiment of the invention, the feed-back circuit includes: a comparator for comparing an output voltage from the charge-voltage conversion circuit with a predetermined voltage; a delay element for delaying an output from the comparator; and a digital-to-analog converter for converting a digital signal output from the delay element to an analog signal.

According to another aspect of this invention, a signal processing circuit for a charge generation type detection device includes a charge-voltage conversion circuit for converting a charge generated in the charge generation type detection device to a voltage. The charge-voltage conversion circuit includes: a first capacitor for storing the charge generated in the charge generation type detection device: an inverter connected to the first capacitor to form a feed-back loop; and a first switch connected in parallel with the first capacitor for discharging the charge stored in the first capacitor.

In one embodiment of the invention, the first switch includes a first transistor for generating a first clock feed-through and a second transistor for generating a second clock feed-through, the first switch being configured so that at least a portion of the first clock feed-through is canceled by the second clock feed-through.

Thus, the invention described herein makes possible the advantages of: (1) providing a signal processing circuit for a charge generation type detection device having a reduced DC offset error in the output voltage and reduced high-frequency noise to the output voltage; (2) providing a signal processing circuit for a charge generation type detection device with which a wide dynamic range can be realized: (3) providing a signal processing circuit for a charge generation type detection device whose circuit scale can be reduced, and (4) providing a signal processing circuit for a charge generation type detection device having reduced 1/f noise and reduced quantization noise.

These and other advantages of the present invention will become apparent to those skilled in the art upon reading and understanding the following detailed description with reference to the accompanying figures.

DESCRIPTION OF THE PREFERRED EMBODIMENTS

Illustrative embodiments of the present invention will now be described with reference to the accompanying drawings.

(Embodiment 1)

Figure 1:
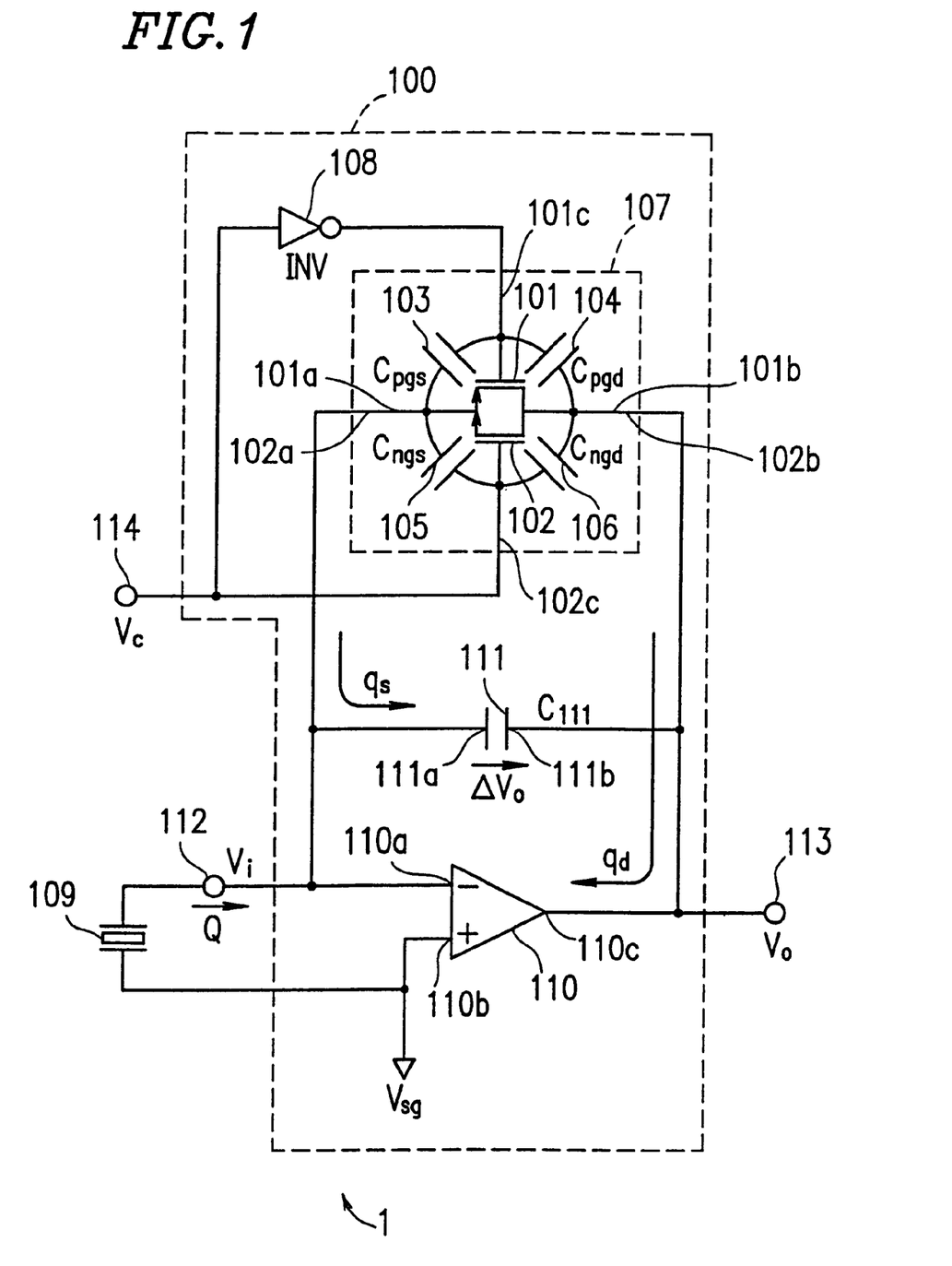
FIG. 1 illustrates a configuration of an infrared radiation detection circuit 1 according to Embodiment 1 of the present invention.

FIG. 1 illustrates a configuration of an infrared radiation detection circuit 1 according to Embodiment 1 of the present invention, as an exemplary signal processing circuit for a charge generation type detection device. In the following description, it is assumed that the charge generation type detection device is an infrared sensor. However, any type of sensor which generates a charge, e.g., a pyroelectric sensor and a pressure sensor, may alternatively be used as the charge generation type detection device.

The infrared radiation detection circuit 1 includes a charge-voltage conversion circuit 100 for converting a charge generated in an infrared sensor 109 to a voltage. The charge-voltage conversion circuit 100 includes an input terminal 112, an output terminal 113 and a control terminal 114.

The infrared sensor 109 is a detection device for electrically converting a slight temperature change caused by infrared radiation to a voltage, and has a pyroelectric effect of generating a charge according to the intensity of the infrared radiation from an object to be measured. One terminal of the infrared sensor 109 is connected to the signal ground potential $V_{sg}$, and the other terminal thereof is connected to the input terminal 112 of the charge-voltage conversion circuit 100.

The charge-voltage conversion circuit 100 includes a capacitor 111 for storing a charge generated in the infrared sensor 109, an operational amplifier 110 which is connected to the capacitor 111 to form a feed-back loop, and a CMOS type switch 107 connected in parallel with the capacitor 111 for discharging the charge stored in the capacitor 111. Thus, the CMOS type switch 107 is used as a reset switch of the charge-voltage conversion circuit 100.

An inverted input 110a of the operational amplifier 110 is connected to the input terminal 112. A non-inverted input 110b of the operational amplifier 110 is connected to the signal ground potential $V_{sg}$. An output 110c of the operational amplifier 110 is connected to the output terminal 113.

One end 111a of the capacitor 111 is connected to the inverted input 110a of the operational amplifier 110. The other end 111b of the capacitor 111 is connected to the output 110c of the operational amplifier 110.

The CMOS type switch 107 includes a P-channel type transistor (hereinafter, referred to simply as "P-Tr") 101 and an N-channel type transistor (hereinafter, referred to simply as "IN-Tr") 102.

A source 101a of the P-Tr 101 and a source 102a of the N-Tr 102 are connected to the inverted input 110a of the operational amplifier 110. A drain 101b of the P-Tr 101 and a drain 102b of the N-Tr 102 are connected to the output 110a of the operational amplifier 110. A gate 101a of the P-Tr 101 is connected to the control terminal 114 via an inverter 108. A gate 102c of the N-Tr 102 is connected to the control terminal 114.

The CMOS type switch 107 is controlled according to the control voltage $V_c$ applied to the control terminal 114. Thus, when $V_c=V_{DD}$, the P-Tr 101 and the N-Tr 102 are both turned ON. When $V_c=V_{SS}$, the P-Tr 101 and the N-Tr 102 are both turned OFF. Herein, $V_{DD}$ denotes a power supply voltage and $V_{SS}$ denotes a ground voltage. In this way, the P-Tr 101 and the N-Tr 102 are repeatedly turned ON/OFF according to the control voltage $V_c$.

Thus, the charge-voltage conversion circuit 100 functions as a switched capacitor integration circuit ("SC integration circuit").

A parasitic capacitance exists in the CMOS type switch 107 of the charge-voltage conversion circuit 100. As illustrated in FIG. 1, the parasitic capacitance of the CMOS type switch 107 includes a parasitic capacitance 103 between the gate and the source of the P-Tr 101, a parasitic capacitance 104 between the gate and the drain of the P-Tr 101, a parasitic capacitance 105 between the gate and the source of the N-Tr 102, and a parasitic capacitance 106 between the gate and the drain of the N-Tr 102. Herein, the capacitance value of the parasitic capacitance 103 is denoted by $C_{pgs}$, the capacitance value of the parasitic capacitance 104 is denoted by $C_{pgd}$, the capacitance value of the parasitic capacitance 105 is denoted by $C_{ngs}$, and the capacitance value of the parasitic capacitance 106 is denoted by $C_{ngd}$.

The CMOS type switch 107 is formed so as to satisfy Expressions (8) and (9) below. For example, the size of the P-Tr 101 and the size of the N-Tr 102 are predetermined so as to satisfy Expressions (8) and (9) below.

$$C_{pgs}=C_{ngs} \tag{8}$$

$$C_{pgd}=C_{ngd} \tag{9}$$

When the CMOS type switch 107 transitions from ON to OFF (i.e., when the voltage applied to the gate 102c of the N-Tr 102 transitions from $V_{DD}$ to $V_{SS}$, and the voltage applied to the gate 101c of the P-Tr 101 transitions from $V_{SS}$ to $V_{DD}$) a clock feed-through occurs in each of the P-Tr 101 and the N-Tr 102. Due to the clock feed-through, a charge $q_s$ is provided to the end 111a of the capacitor 111, and a charge $q_d$ is provided to the output 110a of the operational amplifier 110.

The charge $g_s$ is expressed by Expression (10) below, and the charge $q_d$ is expressed by Expression (11) below.

$$q_s=(C_{pgs}-C_{ngs}) \cdot (V_{DD}-V_{SS}) \tag{10}$$

$$q_d=(C_{pgd}-C_{ngd}) \cdot (V_{DD}-V_{SS}) \tag{11}$$

Expressions (12) and (13) below are obtained by applying Expressions (8) and (9) to Expressions (10) and (11), respectively.

$$q_s = 0 \quad (12)$$

$$q_d = 0 \quad (13)$$

Due to the charge $q_s$ as shown in Expression (10), the offset voltage $\Delta V_{offset}$ occurring at the output terminal 113 becomes zero. Thus, Expression (14) below holds.

$$\Delta V_{offset} = 0 \quad (14)$$

It can be seen from Expression (14) that no DC of set voltage error occurs in the output voltage $V_o$.

Moreover, the voltage change $\Delta V_{offset}(t)$ occurring at the output terminal 113 due to the charge qd as shown in Expression (11) is expressed by Expression (15) below.

$$\Delta V_{offset}(t) = Z_o \cdot \{\partial(q_d)/\partial t\} \quad (15)$$

Under a condition where Expression (9) holds, the voltage applied to the gate 101c of the P-Tr 101 transitions from $V_{SS}$ to $V_{DD}$ substantially simultaneously with the transition of the voltage applied to the gate $102_c$ of the N-Tr 102 from $V_{PP}$ to $V_{SS}$. Therefore, $\partial(q_d)/\partial t = 0$ holds. Thus, Expression (16) below is obtained from Expression (15) above.

$$\Delta V_{offset}(t) = 0 \quad (16)$$

It can be seen from Expression (16) that no high-frequency noise to the output voltage $V_o$ occurs when turning the reset switch (CMOS type switch 107) ON/OFF.

As described above, in the infrared radiation detection circuit 1 according to Embodiment 1 of the present invention, the CMOS type switch 107 is used as a reset switch of the charge-voltage conversion circuit 100, and the P-Tr 101 and the N-Tr 102 included in the CMOS type switch 107 are formed so as to satisfy Expressions (8) and (9). In this way, the clock feed-through generated by the P-Tr 101 and the clock feed-through generated by the N-Tr 102 can have opposite signs and the same amount. Therefore, the clock feed-through generated by the P-Tr 101 and the clock feed-through generated by the N-Tr 102 are canceled by each other. Thus, the clock feed-through of the reset switch of the charge-voltage conversion circuit 100 can be substantially zero. As a result, the DC offset voltage error in the output voltage $V_o$ of the charge-voltage conversion circuit 100 can be substantially zero, thereby preventing occurrence of high-frequency noise to the output voltage $V_o$ of the charge-voltage conversion circuit 100.

Since the reset switch of the charge-voltage conversion circuit 100 can be provided by using the CMOS type switch 107 and the CMOS type inverter 108, the size of the infrared radiation detection circuit 1 can easily be reduced. Moreover, the infrared radiation detection circuit 1 consumes only a small amount of power for turning the CMOS type switch 107 ON/OFF. Therefore, it is possible to easily improve the performance of the infrared radiation detection circuit 1 without substantially increasing the power consumption thereof.

The present embodiment has illustrated an example where the reset switch of the charge-voltage conversion circuit 100 is configured so that the clock feed-through of the reset switch of the charge-voltage conversion circuit 100 is substantially zero. However, substantially the same effects as those described above can be obtained, as long as the clock feed-through can be suppressed, even when the clock feed-through of the reset switch of the charge-voltage conversion circuit 100 :s not substantially zero. Therefore, a modification where the reset switch of the charge-voltage conversion circuit 100 is configured so as to suppress the clock feed-through thereof is also within the scope of the present invention. For example, the P-Tr 101 and the N-Tr 102 included in the CMOS type switch 107 may be formed so that at least a portion of the clock feed-through generated by the P-Tr 101 is canceled by the clock feed-through generated by the N-Tr 102 (or so that at least a portion of the clock feed-through generated by the N-Tr 102 is canceled by the clock feed-through generated by the P-Tr 101).

Alternatively, a further CMOS type switch for canceling a clock feed-through may be additionally provided on at least one side of the CMOS type switch 107, e.g., on the input side of the operational amplifier 110, so as to suppress the clock feed-through of the CMOS type switch 107 (more preferably, so that the clock feed-through of the CMOS type switch 107 is zero). In this case, the ON/OFF state of the additional CMOS type switch is controlled to be opposite to the ON/OFF state of the CMOS type switch 107.

Embodiment 1 illustrates an example where the CMOS type switch 107 is used as the reset switch of the charge-voltage conversion circuit 100. However, the reset switch of the charge-voltage conversion circuit 100 is not limited to a CMOS type switch. For example, the reset switch of the charge-voltage conversion circuit 100 may alternatively be a switch including a first transistor (either P-type or N-type) for generating a clock feed-through and A second compensation transistor (either P-type or N-type regardless of the conductivity type of the first transistor) for absorbing the clock feed-through generated by the first transistor. When a CMOS type switch is used as the reset switch of the charge-voltage conversion circuit 100, the first translator has a conductivity type different from that of the second transistor.

Each of the above-described modifications to the switch 107 may also be used in any of the other embodiments which Will be described below with reference to FIGS. 2, 3, 5 to 7.

(Embodiment 2)

Figure 2:
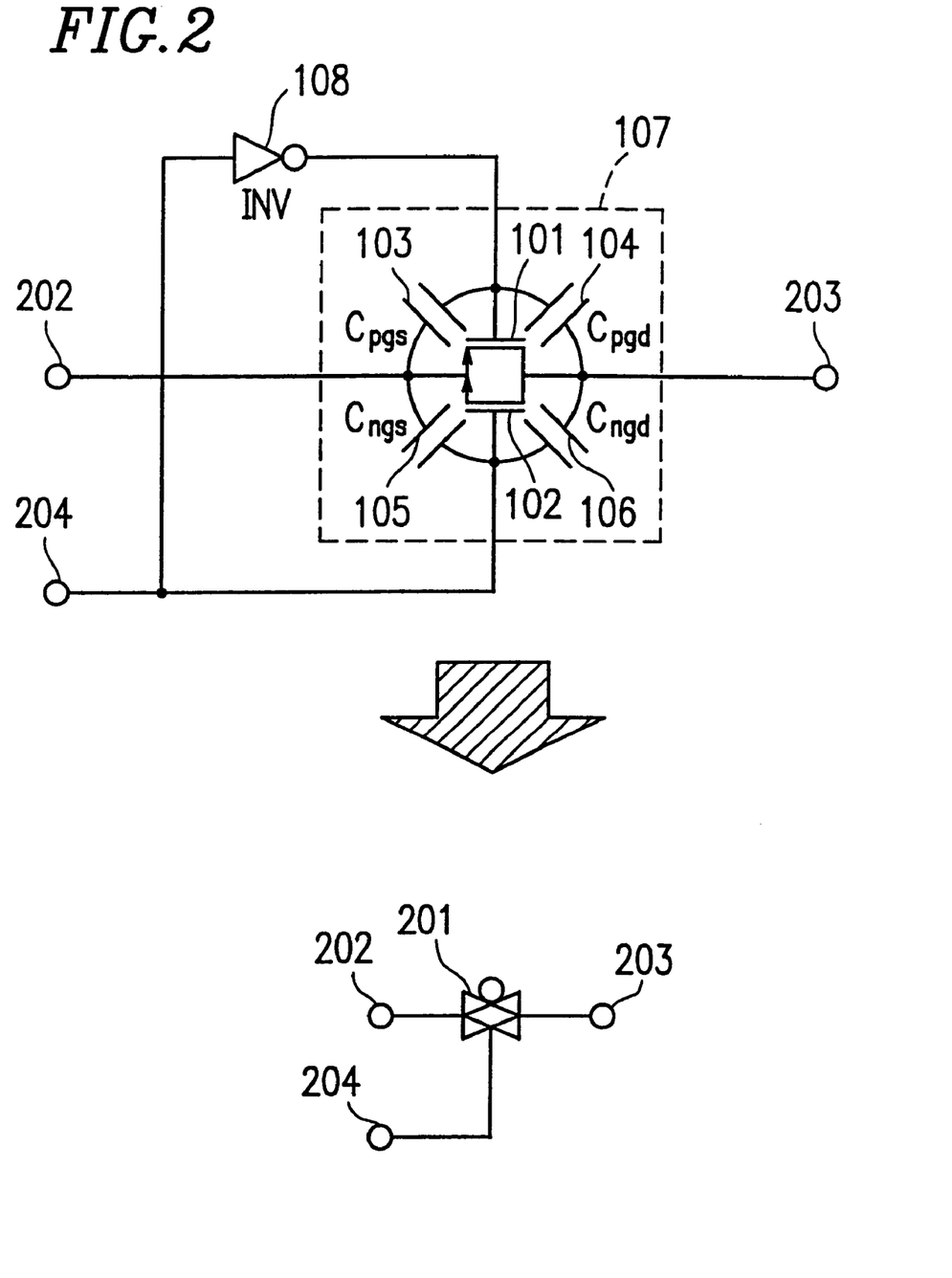
FIG. 2 shows a simplified representation of the circuit configuration illustrated in FIG. 1.

FIG. 2 shows a simplified representation of the CMOS type switch 107 and the inverter 108 illustrated in FIG. 1. The CMOS type switch 107 and the inverter 108 are a circuit which is equivalent to a switch 201 as illustrated in FIG. 2. In FIG. 2, reference numeral 202 denotes a switch input terminal, 203 a switch output terminal, and 204 a switch control terminal. A switch open/close control signal is applied to the switch control terminal 204.

The simplified representation as shown in FIG. 2 will be used in the following description.

Figure 3:
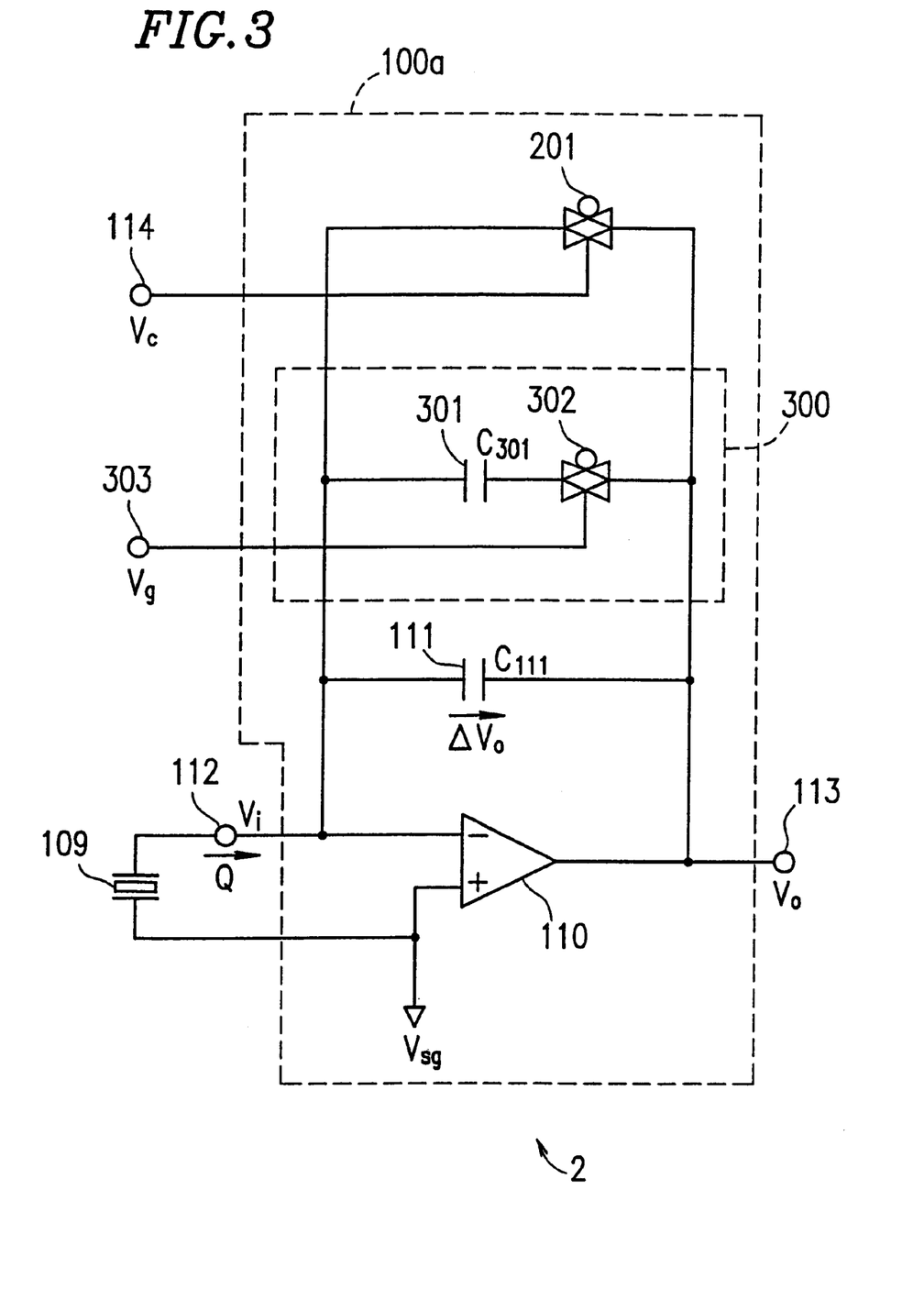
FIG. 3 illustrates a configuration of an infrared radiation detection circuit 2 according to Embodiment 2 of the present invention.

FIG. 3 illustrates a configuration of an infrared radiation detection circuit 2 according to Embodiment 2 of the present invention, as an exemplary signal processing circuit for a charge generation type detection device.

The infrared radiation detection circuit 2 includes a charge-voltage conversion circuit 100a for converting a charge generated in the infrared sensor 109 to a voltage. In addition to the elements of the charge-voltage conversion circuit 100 illustrated in FIG. 1, the charge-voltage conversion circuit 100a further includes a circuit 300 which is connected in parallel with the capacitor 111.

The circuit 300 includes a capacitor 301 and a switch 302 serially connected to the capacitor 301. A switch control terminal of the switch 302 Is connected to a gain control terminal 303. The switch 302 is turned ON/OFF according to a gain control voltage $V_g$ applied to the gain control terminal 303.

When $V_g=V_{SS}$, the switch-302 is OFF. Therefore, the charge which has been generated in the infrared sensor 109 during a period in which the switch 107 is OFF is stored only in the capacitor 111. Thus, the amount of voltage change $\Delta V_o$ of the output voltage $V_o$ where $V_g=V_{SS}$ is expressed by Expression (3) above.

When $V_g=V_{DD}$, the switch 302 is ON. In this case, the charge which has been generated in the infrared sensor 109 during a period in which the switch 107 is OFF is stored in the combined capacitor which is obtained by connecting the capacitor 111 and the capacitor 301 in parallel with each other. Thus, the amount of voltage change $\Delta V_o'$ of the output voltage $V_o$ where $V_q=V_{DD}$ is expressed by Expression (17) below.

$$V_o'=-Q/(C_{111}+C_{301}) \quad (17)$$

Herein, $C_{111}$ denotes the capacitance value of the capacitor 111 and $C_{301}$ denotes the capacitance value of the capacitor 301.

Based on Expressions (3) and (17), the gain $\Delta V_o'/\Delta V_o$ of the amount of voltage change of the output voltage $V_o$ is expressed by Expression (18) below.

$$\Delta V_o'/\Delta V_o = C_{111}/(C_{111}+C_{301}) \quad (18)$$

It can be seen from Expression (18) that the gain $\Delta V_o'/\Delta V_o$ of the amount of voltage change of the output voltage $V_o$ can be adjusted to any value by adjusting the capacitance values $C_{111}$ and $C_{301}$.

As described above, in the infrared radiation detection circuit 2 according to Embodiment 2 of the present invention, the circuit 300 including the capacitor 301 and the switch 302 which is controlled by the gain control voltage $V_g$ is provided in parallel with the capacitor 111. Thus, it Is possible to easily adjust the gain $\Delta V_o'/\Delta V_o$ of the amount of voltage change of the output voltage $V_o$.

Moreover, by providing the capacitor 301 in the vicinity of the capacitor 111 in the charge-voltage conversion circuit 100a, the relative error between these capacitance can be very small. As a result, it is possible to precisely set the gain $\Delta V_o'/\Delta V_o$ of the amount of voltage change of the output voltage $V_o$.

As the intensity of the infrared radiation increases, the amount of charge Q generated in the infrared sensor 109 also increases. In a region where the amount of charge Q Is large, the output voltage $V_0$ does not change according to Expression (2), resulting in a situation where the output voltage $V_o$ is saturated to the power supply voltage $V_{DD}$ or the ground voltage $V_{SS}$. The above-described gain adjustment is particularly effective in preventing the output voltage $V_o$ from being saturated to the power supply voltage $V_{PP}$ or the ground voltage $V_{SS}$. By reducing the amount of voltage change through the gain adjustment, it is possible to control the level of the output voltage $V_o$ within a range such that the output voltage $V_o$ is not saturated. Thus, it is possible to realize a wide dynamic range.

In place of the circuit 300, two or more circuits each having a similar configuration to that of the circuit 300 may be connected in parallel with the capacitor 111. Thus, it is possible to provide an infrared radiation detection circuit in which it is possible to selectively set a plurality of gains.

(Embodiment 3)

Figure 4:
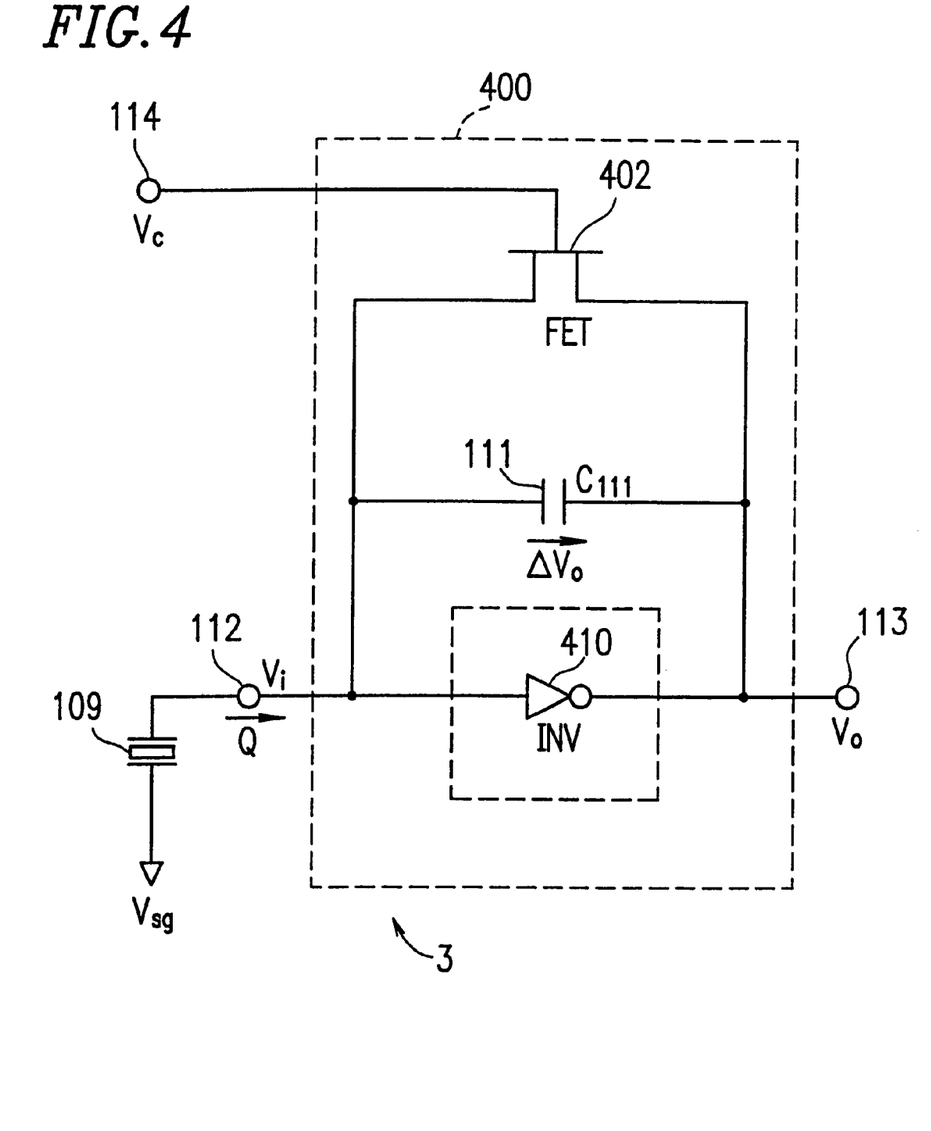
FIG. 4 illustrates a configuration of an infrared radiation detection circuit 3 according to Embodiment 3 of the present invention.

FIG. 4 illustrates a configuration of an infrared radiation detection circuit 3 according to Embodiment 3 of the present invention, as an exemplary signal processing circuit for a charge generation type detection device.

The infrared radiation detection circuit 3 includes a charge-voltage conversion circuit 400 for converting a charge generated in the infrared sensor 109 to a voltage. The charge-voltage conversion circuit 400 includes an input terminal 112, an output terminal 113 and a control terminal 114.

One terminal of the infrared sensor 109 is connected to the signal ground potential $V_{sg}$, and the other terminal thereof is connected to the input terminal 112 of the charge-voltage conversion circuit 400.

The charge-voltage conversion circuit 400 includes the capacitor 111 for storing a charge generated in the infrared sensor 109, an inverter 410 which is connected to the capacitor 111 to form a feed-back loop, and a FET 402 connected in parallel with the capacitor 111 which functions as a switch for discharging the charge stored in the capacitor 111. Thus, the FET 402 is used as a reset switch of the charge-voltage conversion circuit 400.

For example, the inverter 410 is a CMOS type inverter.

The FET 402 is controlled according to the control voltage $V_c$ applied to the control terminal 114. Thus, the FET 402 is turned ON when $V_c=V_{DD}$ and turned OFF when $V_c=V_{SS}$. Herein, $V_{DD}$ denotes a power supply voltage and $V_{SS}$ denotes a ground voltage. In this way, the FET 402 is repeatedly turned ON/OFF according to the control voltage $V_c$.

Thus, the charge-voltage conversion circuit 400 functions as a switched capacitor integration circuit ("SC integration circuit").

An operation of the charge-voltage conversion circuit 400 will now be described.

When $V_c=V_{DD}$, the FET 402 is turned ON, thereby initializing the charge-voltage conversion circuit 400 with the amount of charge in the capacitor 111 being reset to zero. In this case, the output voltage $V_o$ at the output terminal 113 is expressed by Expression (19) below.

$$V_o=V_{inv} \quad (19)$$

Herein, $V_{inv}$ denotes an intermediate potential at which the input/output of the inverter 410 reaches equilibrium.

Next, when $V_o=V_{SS}$, the FET 402 is turned OFF, thereby starting an operation of integrating the amount of charge being input from the infrared sensor 109 to the charge-voltage conversion circuit 400. When an amount of charge Q flows from the infrared sensor 109 into the charge-voltage conversion circuit 400 during A period in which the FET 402 is OFF, the output voltage $V_o$ at the output terminal 113 is expressed by Expression (20) below.

$$V_o=V_{inv}-Q/C_{111} \quad (20)$$

Herein, $C_{111}$ denotes the capacitance value of the capacitor 111.

Based voltage Expressions (19) and (20), the amount of voltage change $\Delta V_o$ at the output terminal 113 corresponding to the amount of charge Q generated in the infrared sensor 109 during a period in which the FET 402 is turned OFF is expressed by Expression (21) below.

$$\Delta V_o=-Q/C_{111} \quad (21)$$

Thus, the charge-voltage conversion circuit 400 can generate a voltage according to the amount of charge Q generated in the infrared sensor 109.

As described above, in the infrared radiation detection circuit 3 according to Embodiment 3, the inverter 410 is used instead of an operational amplifier. In this way, it is possible to reduce the scale of the charge-voltage conversion circuit 400 from that of the conventional charge-voltage conversion circuit 801 illustrated in FIG. 8.

The effect of reducing the circuit scale is particularly pronounced when implementing an infrared radiation detection apparatus including a plurality of infrared sensors arranged in a one-dimensional or two-dimensional arrangement (e.g., when two or more infrared sensors are arranged on a single semiconductor chip). This is because such an infrared radiation detection apparatus has to accommodate a plurality of infrared radiation detection circuits respectively corresponding to the plurality of infrared sensors.

While Embodiment 3 employs the single inverter 410, the present invention is not limited to this. The single inverter 410 may be replaced with a structure including an odd number (three or more) of such inverters serially connected together. Each of the odd number (three or more) of inverters is, for example, a CMOS type inverter.

(Embodiment 4)

Figure 5:
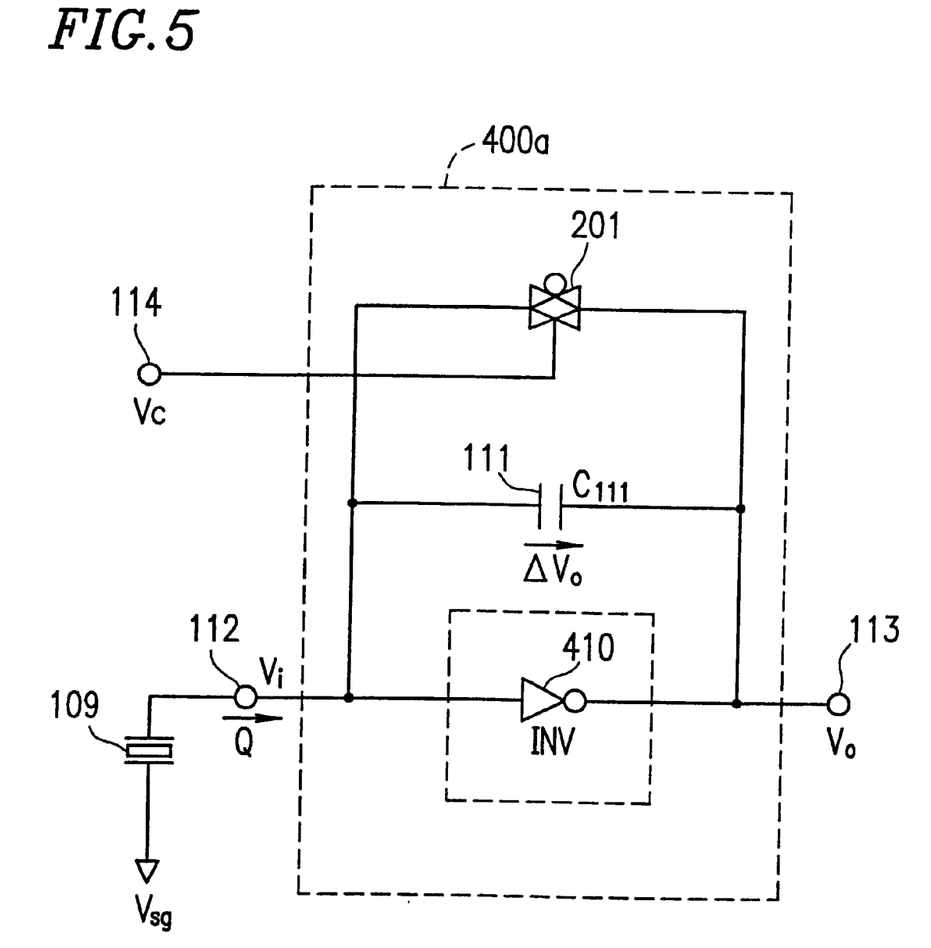
FIG. 5 illustrates a configuration of an infrared radiation detection circuit 4 according to Embodiment 4 of the present invention.

FIG. 5 illustrates a configuration of an infrared radiation detection circuit 4 according to Embodiment 4 of the present invention, as an exemplary signal processing circuit for a charge generation type detection device.

The infrared radiation detection circuit 4 includes a charge-voltage conversion circuit 400a for converting a charge generated in the infrared sensor 109 to a voltage.

The charge-voltage conversion circuit 400a has a configuration where the FET 402 of the charge-voltage conversion circuit 400 illustrated in FIG. 4 is replaced with the switch 201.

As illustrated in FIG. 2, the switch 201 includes the CMOS type switch 107 having the P-Tr 101 and the N-Tr 102 and the inverter 108 connected to the gate of the P-Tr 101.

The P-Tr 101 and the N-Tr 102 are formed so as to satisfy Expressions (8) and (9). Thus, as in Embodiment 1, the clock feed-through of the reset switch 201 of the charge-voltage conversion circuit 400a can be suppressed (or more preferably, eliminated). As a result, it Is possible to reduce a DC offset voltage error in the output voltage $V_o$ of the charge-voltage conversion circuit 400a, and to reduce the high-frequency noise to the output voltage $V_o$ of the charge-voltage conversion circuit 400a.

Moreover, by using the inverter 410 instead of an operational amplifier, it is possible to reduce the circuit scale of the charge-voltage conversion circuit 400a from that of the charge-voltage conversion circuit 100 illustrated in FIG. 1.

The effect of reducing the circuit scale is particularly pronounced when implementing an infrared radiation detection apparatus including a plurality of infrared sensors arranged in a one-dimensional or two-dimensional arrangement (e.g., when two or more infrared sensors are arranged on a single semiconductor chip). This is because such an infrared radiation detection apparatus has to accommodate a plurality of infrared radiation detection circuits respectively corresponding to the plurality of infrared sensors.

(Embodiment 5)

Figure 6:
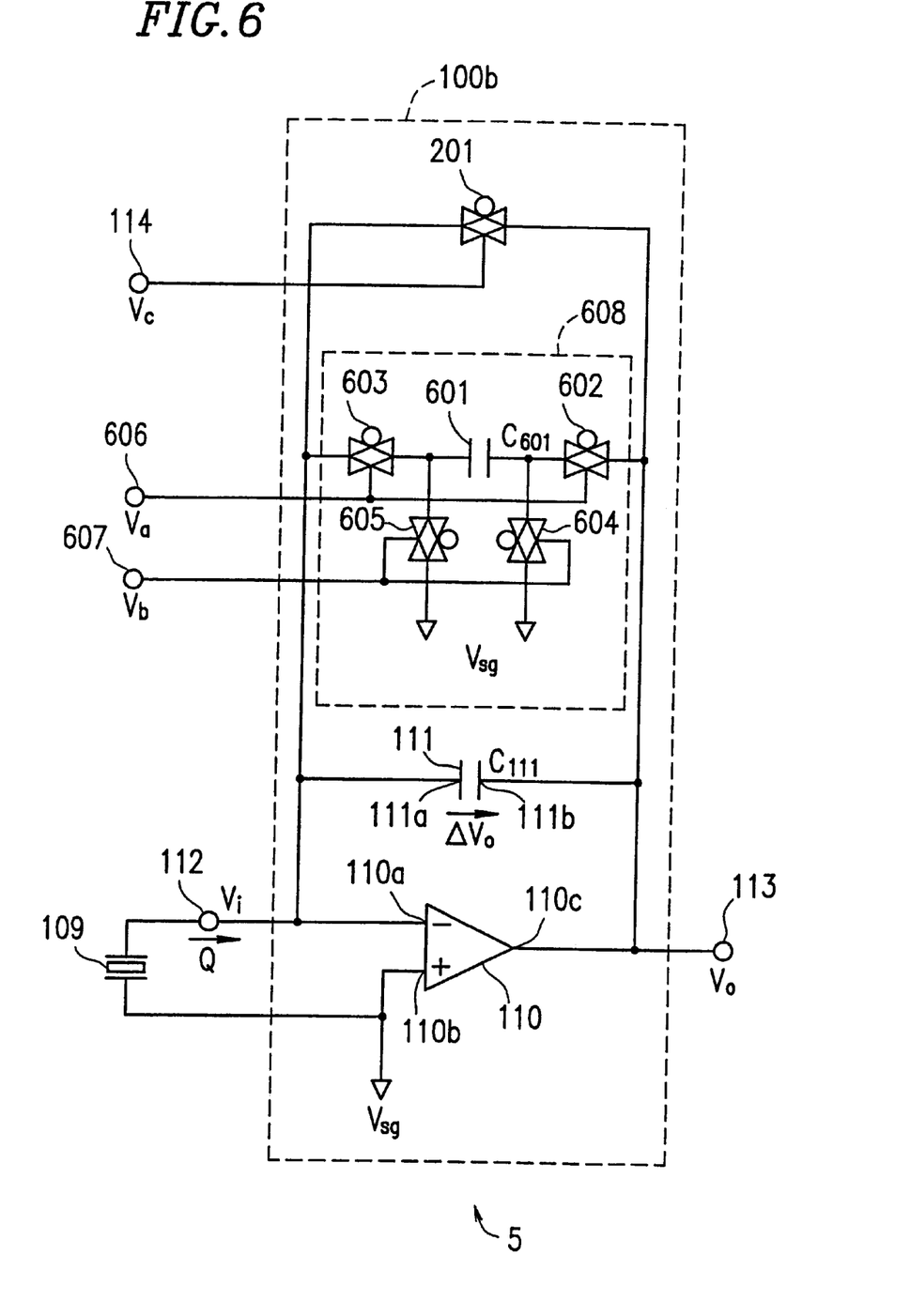
FIG. 6 illustrates a configuration of an infrared radiation detection circuit 5 according to Embodiment 5 of the present invention.

FIG. 6 illustrates a configuration of an infrared radiation detection circuit 5 according to Embodiment 5 of the present invention, as an exemplary signal processing circuit for a charge generation type detection device.

The infrared radiation detection circuit 5 includes a charge-voltage conversion circuit 100b for converting a charge generated in the infrared sensor 109 to a voltage. In addition to the elements of the charge-voltage conversion circuit 100 illustrated in FIG. 1, the charge-voltage conversion circuit 100b further includes a circuit (feed-back resistor) 608 which is connected in parallel with the capacitor 111.

The circuit 608 includes a capacitor 601, switches 602 and 604 connected to one end of the capacitor 601, and switches 603 and 605 connected to the other end of the capacitor 601.

One end of the switch 602 is connected to the capacitor 601, and the other end thereof is connected to the output 110c of the operational amplifier 110. One end of the switch 603 is connected to the capacitor 601, and the other end thereof is connected to the inverted input 110a of the operational amplifier 110. The switches 602 and 603 are turned ON/OFF according to a clock signal $V_a$ applied to a control terminal 606.

One end of the switch 604 is connected to the capacitor 601, and the other end thereof is connected to the signal ground potential $V_{sg}$. One end of the switch 605 is connected to the capacitor 601, and the other end thereof is connected to the signal ground potential $V_{sg}$. The switches 604 and 605 are turned ON/OFF according to a clock signal $V_b$ applied to the control terminal 607.

Each of the clock signals $V_a$ and $V_b$ is a clock signal having a period of T. The ON-period of the clock signal $V_a$ (i.e., a period of time while the switches 602 and 603 are turned ON) and the ON-period of the clock signal $V_b$ (i.e., a period of time while the switches 604 and 605 are turned ON) do not overlap each other.

The circuit 608 is a switched capacitor ("SC") circuit which functions au a resistor. The capacitor 111, the operational amplifier 110 and the circuit 608 together function as a switched capacitor circuit having a filter function (i.e., a switched capacitor filter (hereinafter, referred to simply as "SCF")). Thus, the charge-voltage conversion circuit 100b has a low-pass filter having a first-order low pass filter characteristic.

Where $\omega_o$ denotes a cut-off frequency, i.e., a frequency at which the frequency characteristic of the low-pass filter is 3 dB lower than that of a 0 Hz direct current, the first-order low pass filter cut-off frequency $\omega_o$ is expressed by Expression (22) below.

$$\omega_o = C_{601}/(C_{111} \cdot T) \tag{22}$$

Herein, $C_{111}$ denotes the capacitance value of the capacitor 111 and $C_{601}$ denotes the capacitance value of the capacitor 601.

Where R denotes the resistance value of the resistor provided by the circuit 608, the resistance value R is expressed by Expression (23) below.

$$R = T/C_{601} \tag{23}$$

Based on Expressions (22) and (23), Expression (24) shown below is obtained.

$$\omega_o = 1/(C_{111} \cdot R) \tag{23}$$

Conventionally, the amount of charge generated in the infrared sensor 109 is small. Therefore, it was necessary to reduce the capacitance value $C_{111}$ of the capacitor 111 in order to control the output value of the output voltage $V_o$ to a desired value. In view of this, the filter has conventionally been provided in a stage subsequent to the charge-voltage conversion circuit (integrator).

Embodiment 4 utilizes the fact that the circuit 608 can equivalently create a function of a resistor. For example, the circuit 608 can create a resistor having a resistance value of about 100 MΩ. By adjusting the resistance value R of the resistor created by the circuit 608, the cut-off frequency a can be set to a desired value. Thus, a filter can be built in a charge-voltage conversion circuit (integrator).

As described above, in the infrared radiation detection circuit 5 according to Embodiment 5 of the present invention, the circuit 608 which functions as a resistor is connected in parallel with the capacitor 111. Thus, it is possible to easily realize the charge-voltage conversion circuit 100b having a filter function. Moreover, since the filter function is incorporated in the charge-voltage conversion circuit 100b, the circuit scale of the infrared radiation detection circuit 5 can be reduced.

Embodiment 5 an example where the charge-voltage conversion circuit 100b has a first-order low pass filter characteristic. Alternatively, the charge-voltage conversion circuit 100b may have any higher-order filter characteristic instead of or in addition to the first-order low pass filter characteristic.

While the clock signal $V_a$ is provided to the gate of the P-Tr of each of the switches 602 and 603 via different inverters, the clock signal $V_a$ may alternatively be provided to the gate of the P-Tr of each of the switches 602 and 603 via a common inverter. Similarly, while the clock signal $V_b$ provided to the gate of the P-Tr of each of the switches 604 and 605 via different inverters, the clock signal $V_b$ may alternatively be provided to the gate of the P-Tr of each of the switches 604 and 605 via a common inverter.

(Embodiment 6)

Figure 7:
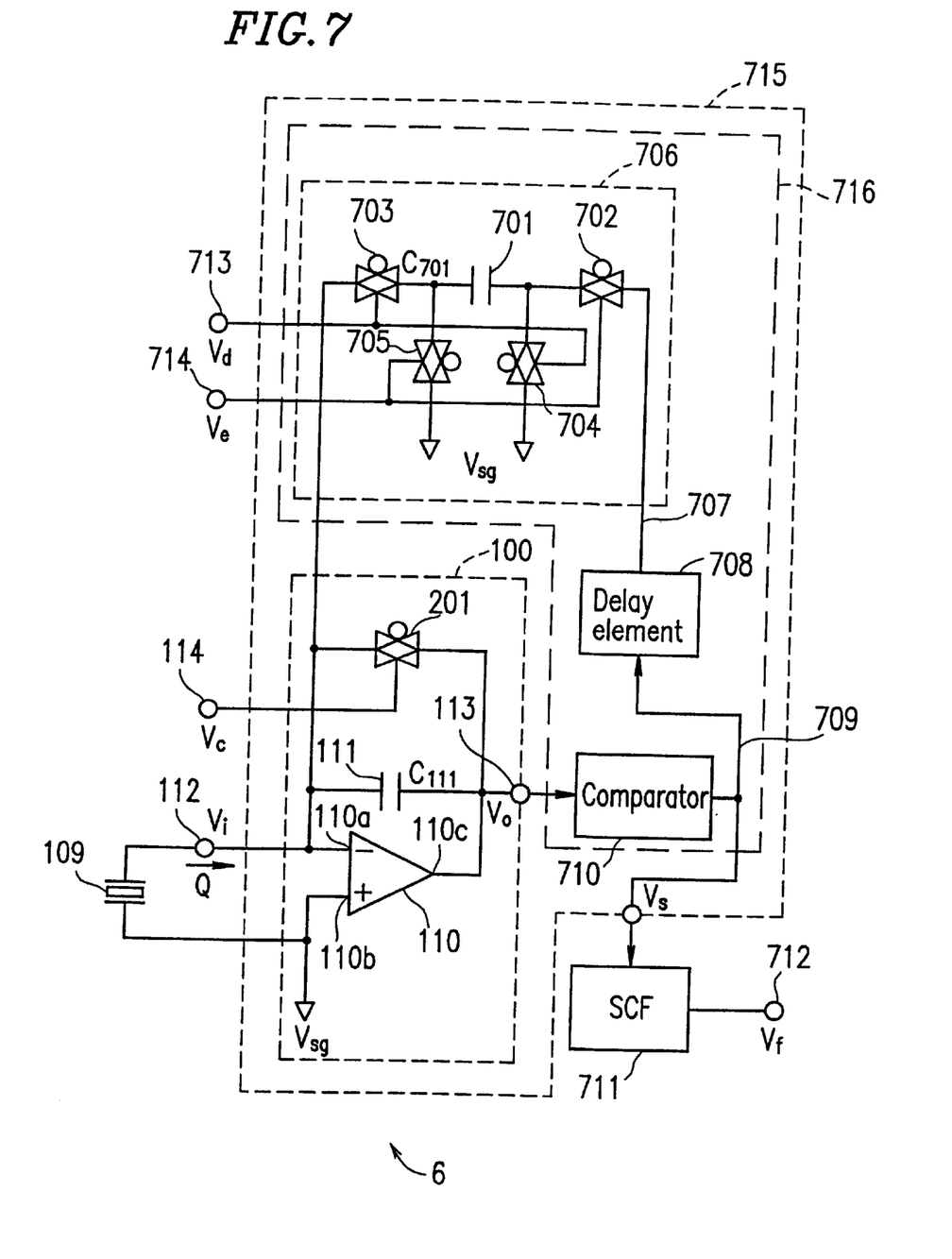
FIG. 7 illustrates a configuration of an infrared radiation detection circuit 6 according to Embodiment 6 of the present invention.

FIG. 7 illustrates a configuration of an infrared radiation detection circuit 6 according to Embodiment 6 of the present invention, as an exemplary signal processing circuit for a charge generation type detection device.

The infrared radiation detection circuit 6 includes the charge-voltage conversion circuit (integrator) 100 for converting a charge generated in the infrared sensor 109 to a voltage, and a feed-back circuit 716 for feeding the output of the charge-voltage conversion circuit 100 back to the input of the charge-voltage conversion circuit 100.

The charge-voltage conversion circuit 100 and the feed-back circuit 716 are configured to have a delta/sigma modulation (ΔΣ modulation) function, as will be described later.

The configuration of the charge-voltage conversion circuit 100 is as described in Embodiment 1 with reference to FIG. 1. Accordingly, like elements are denoted by like references and will not be further described below The feed-back circuit 716 includes a comparator 710 for comparing the output voltage $V_o$ output from the charge-voltage conversion circuit 100 with a predetermined voltage (i.e., the signal ground potential $V_{sg}$), a delay element 708 for delaying an output signal 709 from the comparator 710 by a time Td, and a digital-to-analog converter (hereinafter, referred to simply as "DAC") 706 for converting a digital signal 707 output from the delay element 708 to an analog signal. The analog signal output from the DAC 706 is fed back to the inverted input 110a of the operational amplifier 110 of the charge-voltage conversion circuit 100.

The DAC 706 includes a capacitor 701, switches 702 and 704 connected to one end of the capacitor 701, and switches 703 and 705 connected to the other end of the capacitor 701.

One end of the switch 703 is connected to the capacitor 701, and the other end thereof is connected to the inverted input 110a of the operational amplifier 110. One end of the switch 704 is connected to the capacitor 701, and the other end thereof is connected to the signal ground potential $V_{sg}$. The switches 703 and 704 are turned ON/OFF according to a clock signal $V_d$ applied to a control terminal 713.

One end of the switch 702 is connected to the capacitor 701, and the other end thereof is connected to the output signal 707 of the delay element 708. One end of the switch 705 is connected to the capacitor 701, and the other end thereof is connected to the signal ground potential $V_{sq}$. The switches 702 and 705 are turned ON/OFF according to a clock signal $V_e$ applied to a control terminal 714.

Each of the clock signals $V_d$ and $V_s$ is a clock signal having a period of $T_d$ equal to the delay time $T_d$ of the delay element 708. The ON-period of the clock signal $V_d$ (i.e., a period of time while the switches 703 and 704 are turned ON) and the ON-period of the clock signal $V_e$ (i.e., a period of time while the switches 702 and 705 are turned ON) do not overlap each other.

The DAC 706 is a switched capacitor ("SC") circuit which functions as a resistor. The digital signal 707 is a control signal for applying to the resistor either a positive voltage (i.e., $V_{DD-Vsg}$) or a negative voltage (i.e., $V_{SS}-V_{sg}$) When the positive voltage is applied to the resistor, the output voltage $v_o$ decreases. When the is negative voltage is applied to the resistor, the output voltage $V_o$ increases.

The capacitor 111, the operational amplifier 110 and the DAC 706 together function as a switched capacitor integration circuit ("SC integration circuit").

The output signal 709 from the comparator 710 is provided to an SCF 711. The SCF 711 performs a sampling operation with a frequency that is much higher than that of the clock signals $V_d$ and $V_e$ having the period $T_d$. Such a sampling operation is called oversampling. As a result, the SCF 711 removes an unnecessary component from the output signal 709. The output from the SCF 711 is output through a terminal 712 as a final output voltage $V_f$.

The charge-voltage conversion circuit (integrator) 100, the comparator 710, delay element 708 and the DAC 706 are configured to have a first-order ΔΣ modulation function. Therefore, a circuit 715 illustrated in FIG. 7 is a circuit equivalent to a first-order ΔΣ modulator.

As is well known in the art, the first-order ΔΣ modulation does not process a desired signal, while attenuating the undesired signals of 1/f noise and quantization noise.

As described above, in the infrared radiation detection circuit 6 according to Embodiment 6 of the present invention, the charge-voltage conversion circuit 100 and the feed-back circuit 716 are configured to have a first-order ΔΣ modulation function. Thus, it is possible to reduce 1/f noise and quantization noise which may occur in a switched capacitor integration circuit ("SC integration circuit").

Embodiment 6 illustrates an example where the charge-voltage conversion circuit 100 and the feed-back circuit 716 are configured to have a first-order ΔΣ modulation function. However, the present invention is not limited to this. Alternatively, the charge-voltage conversion circuit 100 and the feed-back circuit 716 may be configured to have any higher-order ΔΣ modulation function.

According to the invention, a first switch (a reset switch) is configured so that at least a portion of a first clock feed-through generated by a first transistor is canceled by a second clock feed-through generated by a second transistor. Thus, it is possible to suppress the clock feed-through of the reset switch. As a result, it is possible to reduce a DC offset voltage error in the output voltage, and to suppress occurrence of high-frequency noise to the output voltage.

According to the invention, the clock feed-through of the reset switch can be substantially zero. As a result, the DC offset voltage error in the output voltage can be substantially zero, thereby preventing occurrence of high-frequency noise to the output voltage.

According to the invention, a circuit including a second capacitor and a second switch which is controlled by a gain control voltage is provided in parallel with a first capacitor. Thus, it is possible to easily adjust the gain of the amount of voltage change of the output voltage. It is also possible to realize a wide dynamic range by appropriately adjusting the gain of the amount of voltage change of the output voltage.

According to the invention, a switched capacitor circuit which functions as a resistor is provided in parallel with the first capacitor. Thus, a filter function can be ; incorporated in a charge-voltage conversion circuit. As a result, it is possible to reduce the circuit scale of the infrared radiation detection circuit.

According to the invention, a charge-voltage conversion circuit and a feed-back circuit are configured to have a delta/sigma modulation Thus, it is possible to reduce 1/f noise and quantization noise which may be generated by the switched capacitor integration circuit.

According to the invention, an inverter is used instead of an operational amplifier. Thus, it is possible to reduce the circuit scale of the charge-voltage conversion circuit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal processing circuit for a charge generation detection device, comprising a charge-voltage conversion circuit for converting a charge generated in the charge generation detection device to a voltage, the charge-voltage conversion circuit including:

a first capacitor for storing the charge generated in the charge generation detection device;

an operational amplifier, an output of the operational amplifier being connected to an input of the operational amplifier via the first capacitor so as to form a feed-back loop; and a first switch connected in parallel with the first capacitor for discharging the charge stored in the first capacitor, wherein the first switch includes a first transistor for generating a first clock feed-through and a second transistor for generating a second clock feed-through, a first source electrode and a first drain electrode of the first transistor are connected in parallel with the first capacitor, and a second source electrode and a second drain electrode of the second transistor are connected in parallel with the first capacitor so that at least a portion of the first clock feed-through is cancelled by the second clock feed-through, the signal processing circuit further comprising a feed-back circuit for feeding an output of the charge-voltage conversion circuit back to an input of the charge-voltage conversion circuit, wherein the charge-voltage conversion circuit and the feed-back circuit has a delta/sigma modulation function.

2. A signal processing circuit for a charge generation detection device according to claim 1, the feed-back circuit including:

a comparator for comparing an output voltage from the charge-voltage conversion circuit with a predetermined voltage;

a delay element for delaying an output from the comparator; and a digital-to-analog converter for converting a digital signal output from the delay element to an analog signal.

* * * * *